June 7, 1966 G. PATERSON 3,254,444
AMUSEMENT AND EDUCATIONAL HEAD GEAR
Filed May 20, 1963

INVENTOR.
GORDON PATERSON
BY
ATTORNEY

3,254,444
Patented June 7, 1966

**3,254,444
AMUSEMENT AND EDUCATIONAL HEAD GEAR**
Gordon Paterson, 399 E. 72nd St., New York 21, N.Y.
Filed May 20, 1963, Ser. No. 281,486
5 Claims. (Cl. 46—228)

This invention relates to head gear for children for amusement and educational purposes and more particularly to such head gear which can respond to movements of the wearer to create interesting and amusing effects.

One of the objects of this invention is to provide a simple head gear device for use by children in their play and other activities and which can be purely of an amusement nature or can incorporate educational features.

Another object of the invention is to provide a simple head band to which various auxiliary devices can be attached so as to provide a child with a form of amusement with or without educational features such as simple lighting effects or reception of radio programs. Other and further objects and advantages of the invention will be pointed out or apparent hereinafter.

Figure 1:
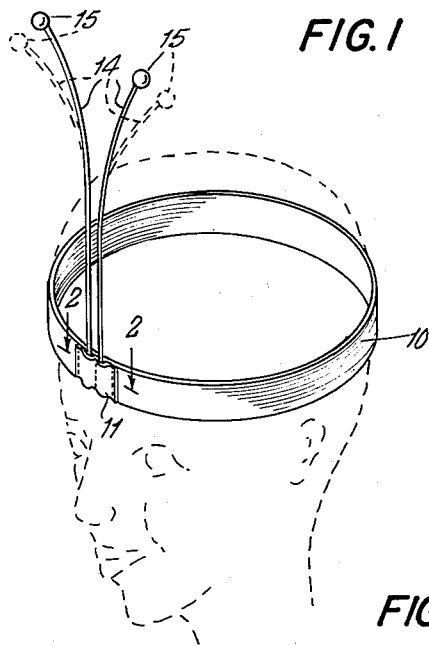
FIGURE 1 is a perspective view of one embodiment of the invention applied to a child's head.
Figure 2:
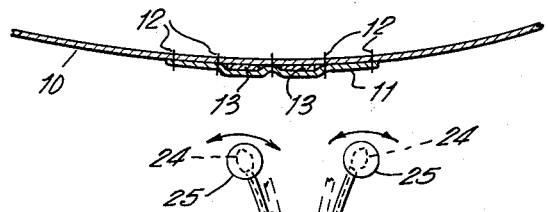
FIGURE 2 is a fragmentary cross-sectional view taken on line 2—2 of FIGURE 1.
Figure 3:
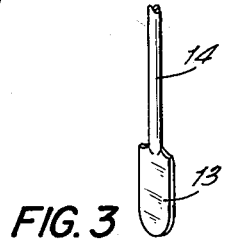
FIGURE 3 is a perspective view of a detail connecting element.

In the form of the invention shown in FIGURES 1-3, the head band 10 is composed of any suitable material such as a stretchable woven fabric which may or may not be elasticized. This head band is of such nature that it can fit snugly around the head of children of various ages so as to be maintained in position while the child is playing or engaged in other activity. On the front portion of head band 10 there is a pocket-like element 11 stitched at 12 to the head band and adapted to receive and frictionally hold the flattened end 13 of each of the flexible springy wire or other element 14 which terminates at its upper end in an ornamental ball 15 which may be colored or uncolored and which is attached to the element 14 in any suitable manner as by providing the ball with a recess or socket into which the end of the element 14 snugly fits. The ball 15 may be composed of any suitable plastic and is preferably of such size and weight that it will cause the wire element 14 to flex or bend back and forth in all different directions during movements of the child. Two such wire elements 14 are provided as shown in the drawing, but it is to be understood that the invention is not necessarily limited to the use of two wire elements since other numbers of elements can be utilized if desired and the arrangement can furthermore be duplicated at the rear of the head band.

Figure 4:
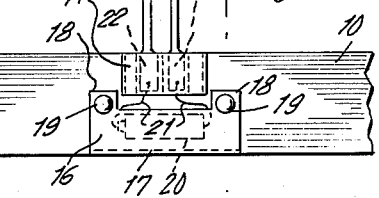
FIGURE 4 is a front elevational view of a modified form of the invention.
Figure 5:
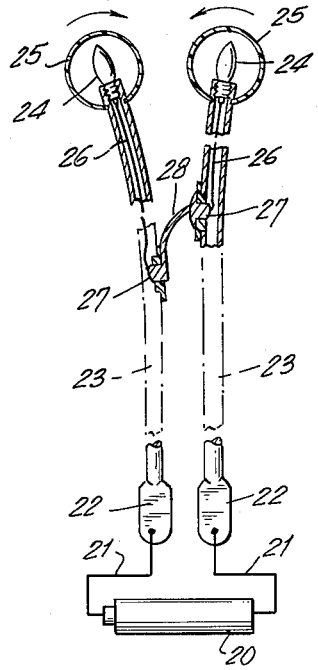
FIGURE 5 is a somewhat enlarged view of a portion of FIGURE 4 to illustrate the electrical connections involved.
Figure 6:
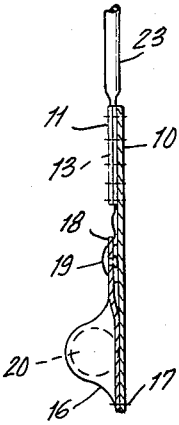
FIGURE 6 is a fragmentary sectional view, partly in elevation, taken on line 6—6 of FIGURE 4 and, FIGURE 7 is a perspective view similar to FIGURE 1 of a further modified form of the invention in which a transistor radio is incorporated.

In the modified form of the invention shown in FIGURES 4-6, the head band 10 is provided with a pocket-like element 16 stitched to the head band along the line 17 and having upwardly extending tabs 18 which can be fastened to the head band by means of the usual snap fasteners 19. Disposed in the pocket thus formed there is a dry cell battery 20 which is connected by wires 21 to the flattened lower ends 22 of the tubular metal elements 23 which terminate at their upper ends in a socket for the reception of a small bulb 24 which may be of any suitable nature such as a flashlight bulb or other source of light. Surrounding the sources of light 24 are hollow plastic or other suitable balls 25 which may be transparent or translucent. Extending downwardly from the contact of each bulb 24 is a wire 26 which is connected on its lower end to a contact 27 suitably secured to the side wall of each of the tubular members 23 and one of which contacts 27 has a connecting switch element 28 which "makes" and "breaks" the circuit as the child moves about and as the tubular elements 23 approach or separate from one another. The supply of current is provided by the battery 20 and wire 21 as referred to above. Thus, during movements of the child, the tubular elements 23 and the balls 25 will move about erratically in various directions and amplitudes, but will, from time to time, come into electrical contact with one another so as to cause flashing of the bulbs or other sources of light 24.

Figure 7:
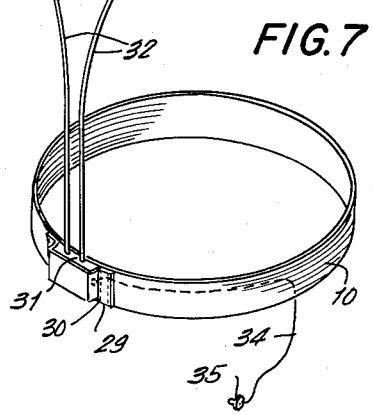

In the further modified form of the invention shown in FIGURE 7 the head band 10 is provided with a socket-like member 29 stitched to the head band at 30 and constructed to receive a small transistor radio 31. In this form of the invention the wires 32 act as an antenna for the transistor radio and the balls 33 can either be ornamental or a part of the antenna system to improve reception. The transistor radio 31 is further provided with an auxiliary wire 34 leading to an ear plug 35 which is utilized in the normal way. This modification of the invention enables the child to receive radio broadcasts and at the same time to have the amusement aspects of the other embodiments of the invention.

While three embodiments of the invention have been illustrated and described, it will be appreciated and understood that other modifications thereof may be made without departing from the scope and principles of the invention. The head band may be composed of a woven or elasticized fabric or material as above mentioned but is not limited to the particular kind of material utilized so long as it is capable of being used in the manner above described. The head band could for example be made of some suitable plastic material of other composition. The antenna-like elements can be made of various metallic or non-metallic materials and may be varied as to their size, length, and degree of flexibility. The foregoing is thus intended as illustrative and not as limitative.

What is claimed is:

1. An amusement and educational head gear device which comprises a head band adapted to be fitted around the head of a child, a pocket-like element attached to said head band exteriorly thereof and a plurality of springy antenna-like elements extending upwardly from said head band and having their lower ends received in said pocket-like element and having at their opposite ends a ball secured thereto, whereby upon movements of the child the antenna-like elements and balls undergo erratic movements.

2. An amusement and educational head gear device which comprises a head band adapted to be fitted around the head of a child, a pocket-like element attached to said head band exteriorly thereof and a plurality of springy antenna-like elements extending upwardly from said head band and having their lower ends received in said pocket-like element and having at their opposite ends a ball secured thereto, whereby upon movements of the child the antenna-like elements and balls undergo erratic movements, each of said antenna-like elements having a flattened lower end portion in said pocket-like element and frictionally held therein, said antenna-like elements being composed of a springy metal wire.

3. An amusement and educational head gear device which comprises a head band adapted to be fitted around the head of a child, a pocket-like element attached to said head band exteriorly thereof and a plurality of springy antenna-like elements extending upwardly from said head band and having their lower ends received in said pocket-like element and having at their opposite ends a ball secured thereto, whereby upon movements of the child the antenna-like elements and balls undergo erratic movements, there being a battery disposed in said pocket-like element and sources of light in said balls together with switch means to make and break an electrical circuit to cause said light sources to flash when the movements of the antenna-like elements complete said electrical circuit.

4. An amusement and educational head gear device which comprises a head band adapted to be fitted around the head of a child, a pocket-like element attached to said head band exteriorly thereof and a plurality of springy antenna-like elements extending upwardly from said head band and having their lower ends received in said pocket-like element and having at their opposite ends a ball secured thereto, whereby upon movements of the child the antenna-like elements and balls undergo erratic movements, there being a battery disposed in said pocket-like element and sources of light in said balls together with switch means to make and break an electrical circuit to cause said light sources to flash when the movements of the antenna-like elements complete said electrical circuit, said antenna-like elements being tubular and provided in their wall surfaces with electrical contacts bridged by a connecting element whenever said antenna-like elements approach one another during their movements.

5. An amusement and educational head gear device which comprises a head band adapted to be fitted around the head of a child, a pocket-like element attached to said head band exteriorly thereof and a plurality of springy antenna-like elements extending upwardly from said head band and having their lower ends received in said pocket-like element and having at their opposite ends a ball secured thereto, whereby upon movements of the child the antenna-like elements and balls undergo erratic movements, said pocket-like element being provided with a transistor radio and an ear plug electrically connected thereto by a flexible insulated wire.

References Cited by the Examiner

UNITED STATES PATENTS

| | | | |
|---|---|---|---|
| 1,776,175 | 9/1930 | Wittekind | 46—53 |
| 2,070,112 | 2/1937 | Bowles | 325—361 |
| 2,678,999 | 5/1954 | Norris | 325—361 |
| 2,679,711 | 6/1954 | Learnard | 46—53 |
| 2,933,853 | 4/1960 | Laval | 46—228 |
| 2,971,082 | 2/1961 | Frank. | |
| 3,037,322 | 6/1962 | Baumgartner | 46—228 |
| 3,074,205 | 1/1963 | Carter | 46—228 |
| 3,150,461 | 9/1964 | Grist | 46—232 |
| 3,156,923 | 11/1964 | Timm | 2—3 |

RICHARD C. PINKHAM, *Primary Examiner.*

DELBERT B. LOWE, R. F. CUTTING,
*Assistant Examiners.*